United States Patent
Shih

(10) Patent No.: US 12,510,735 B2
(45) Date of Patent: Dec. 30, 2025

(54) LENS ASSEMBLY

(71) Applicants: Sintai Optical (Shenzhen) Co., Ltd., ShenZhen (CN); Asia Optical Co., Inc., Taichung (TW)

(72) Inventor: Po-Yuan Shih, Taichung (TW)

(73) Assignees: SINTÁI OPTICAL (SHENZHEN) CO., LTD., Shenzhen (CN); ASIA OPTICAL CO., INC., Taichung (TW)

( * ) Notice: Subject to any disclaimer, the term of this patent is extended or adjusted under 35 U.S.C. 154(b) by 460 days.

(21) Appl. No.: 18/062,042

(22) Filed: Dec. 6, 2022

(65) Prior Publication Data

US 2023/0314767 A1    Oct. 5, 2023

(30) Foreign Application Priority Data

Mar. 30, 2022  (CN) .......................... 202210325075.1

(51) Int. Cl.
*G02B 9/12* (2006.01)
*G02B 1/04* (2006.01)
*G02B 13/00* (2006.01)

(52) U.S. Cl.
CPC ........... *G02B 13/0035* (2013.01); *G02B 1/04* (2013.01); *G02B 9/12* (2013.01)

(58) Field of Classification Search
CPC ........ G02B 13/0035; G02B 1/04; G02B 9/12; G02B 13/06; G02B 13/00
See application file for complete search history.

(56) References Cited

U.S. PATENT DOCUMENTS

| 7,804,653 B2* | 9/2010 | Choi ..................... G02B 13/18 359/716 |
| 8,000,033 B1* | 8/2011 | Tang .................. G02B 13/0035 359/716 |
| 2004/0212901 A1* | 10/2004 | Nanba ................ G02B 13/0035 359/785 |
| 2005/0253952 A1* | 11/2005 | Minefuji ............ G02B 13/0035 348/335 |
| 2006/0028740 A1* | 2/2006 | Murakami ......... G02B 13/0035 359/784 |

(Continued)

FOREIGN PATENT DOCUMENTS

| CN | 114296214 A | 4/2022 |
| TW | M362411 U | 8/2009 |
| TW | 201641985 A | 12/2016 |

*Primary Examiner* — Balram T Parbadia
(74) *Attorney, Agent, or Firm* — McClure, Qualey & Rodack, LLP

(57) ABSTRACT

A lens assembly includes a first lens, a second lens, and a third lens arranged sequentially from an object side to an image side along an optical axis. The first lens has positive refractive power. The second lens has a convex surface facing the image side and negative refractive power. The third lens has a convex surface facing the object side and negative refractive power. The lens assembly satisfies at least one of the following conditions: $2<f/D1<3.5$; $-3<f3/f<-1$; $0.5\ mm<D1+D3<2.4\ mm$; $0.7<f1/D1<2$; wherein f is an effective focal length of the lens assembly, D1 is a maximum effective optical diameter of the first lens, D3 is a maximum effective optical diameter of the third lens, and f1 and f3 are an effective focal length of the first lens and the third lens, respectively.

20 Claims, 8 Drawing Sheets

(56) References Cited

U.S. PATENT DOCUMENTS

| | | | |
|---|---|---|---|
| 2006/0140622 A1* | 6/2006 | Isono | H04N 23/55 |
| | | | 396/439 |
| 2009/0185289 A1* | 7/2009 | Do | G02B 13/0035 |
| | | | 359/716 |
| 2009/0190236 A1* | 7/2009 | Do | G02B 13/16 |
| | | | 359/716 |
| 2009/0201593 A1* | 8/2009 | Isono | G02B 13/18 |
| | | | 359/716 |
| 2016/0170180 A1* | 6/2016 | Son | G02B 13/0045 |
| | | | 359/708 |
| 2018/0239117 A1* | 8/2018 | Lee | G02B 27/0025 |
| 2019/0049707 A1* | 2/2019 | Okada | G02B 15/1431 |
| 2020/0209584 A1* | 7/2020 | Guo | G02B 13/0045 |
| 2020/0301102 A1 | 9/2020 | Chang | |

* cited by examiner

LENS ASSEMBLY

BACKGROUND OF THE INVENTION

Field of the Invention

The invention relates to a lens assembly.

Description of the Related Art

The current development trend of a lens assembly is toward miniaturization. Additionally, the lens assembly is developed to have high resolution, large field of view and resistance to severe environment temperature variation in accordance with different application requirements. However, the known lens assembly can't satisfy such requirements, especially in the medical field and the micro-photographing field. Therefore, the lens assembly needs a new structure to meet the requirements of miniaturization, large field of view, high resolution, and resistance to severe environment temperature variation at the same time.

BRIEF SUMMARY OF THE INVENTION

The invention provides a lens assembly to solve the above problems. The lens assembly of the invention is provided with characteristics of a shortened total lens length, a larger field of view, a higher resolution, a resistance to severe environment temperature variation, and still has a good optical performance.

The lens assembly in accordance with an exemplary embodiment of the invention comprises a first lens, a second lens, and a third lens. The first lens is with positive refractive power. The second lens is with negative refractive power and includes a convex surface facing an image side. The third lens is with negative refractive power and includes a convex surface facing an object side. The first lens, the second lens, and the third lens are arranged in order from the object side to the image side along an optical axis. The lens assembly satisfies at least one of the following conditions: $2<f/D1<3.5$; $-3<f3/f<-1$; $0.5$ mm$<D1+D3<2.4$ mm; $0.7<f1/D1<2$; wherein f is an effective focal length of the lens assembly, D1 is a larger one of optical effective diameter of an object-side surface and an image-side surface of the first lens, D3 is a larger one of optical effective diameter of an object-side surface and an image-side surface of the third lens, f1 is an effective focal length of the first lens, and f3 is an effective focal length of the third lens. If a lens assembly of the invention has the features said above, and satisfies at least any one of the above conditions, then the lens assembly is able to possess the basic function of the invention and is able to meet the requirements said above.

In another exemplary embodiment, the first lens further includes a convex surface facing the image side.

In another exemplary embodiment, the first lens is a biconvex lens, the second lens is a meniscus lens, and the third lens is a meniscus lens.

In another exemplary embodiment, the first lens further includes a convex surface facing the object side, the second lens further includes a concave surface facing the object side, and the third lens further includes a concave surface facing the image side.

In another exemplary embodiment, the first lens is a meniscus lens, the second lens is a meniscus lens, and the third lens is a meniscus lens.

In another exemplary embodiment, the first lens further includes a concave surface facing the object side, the second lens further includes a concave surface facing the object side, and the third lens further includes a concave surface facing the image side.

In another exemplary embodiment, the lens assembly further includes a stop between the object side and the first lens, and the lens assembly satisfies at least one of the following conditions: $80<f/SL<160$; $0<SL/TTL<0.008$, wherein f is an effective focal length of the lens assembly, SL is an interval from the stop to an object-side surface of the first lens along the optical axis, and TTL is an interval from the object-side surface of the first lens to an image plane along the optical axis.

In another exemplary embodiment, the lens assembly satisfies at least one of the following conditions: $0.4<BFL/TTL<0.5$; $0.8<(R11-R12)/(R11+R12)<1.7$; $-3<R11/R22<7$, wherein BFL is an interval from an image-side surface of the third lens to an image plane along the optical axis, TTL is an interval from an object-side surface of the first lens to an image plane along the optical axis, R11 is a radius of curvature of the object-side surface of the first lens, R12 is a radius of curvature of an image-side surface of the first lens, and R22 is a radius of curvature of an image-side surface of the second lens.

In another exemplary embodiment, the lens assembly further comprises an electron-sensitive element between the third lens and the image side, wherein the electron-sensitive element includes a sensing plane. The lens assembly satisfies the following conditions: $0.3<D3/IH<0.6$, wherein D3 is a larger one of optical effective diameter of an object-side surface and an image-side surface of the third lens, and IH is a diagonal length of an effective pixel range of the sensing plane.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

The invention provides a lens assembly comprises a first lens with positive refractive power, a second lens with negative refractive power, and a third lens with negative refractive power. The second lens includes a convex surface facing an image side. The third lens includes a convex surface facing an object side. The first lens, the second lens, and the third lens are arranged in order from the object side to the image side along an optical axis. The lens assembly satisfies at least one of the following conditions: $2<f/D1<3.5$; $-3<f3/f<-1$; 0.5 mm$<D1+D3<2.4$ mm; $0.7<f1/D1<2$; wherein f is an effective focal length of the lens assembly, D1 is a larger one of optical effective diameter of the object-side surface and the image-side surface of the first lens, D3 is a larger one of optical effective diameter of the object-side surface and the image-side surface of the third lens, f1 is an effective focal length of the first lens, and f3 is an effective focal length of the third lens.

Referring to Table 1 to Table 5, Table 1 and Table 4 show the parameters of the lenses in accordance with the first embodiment and the second embodiment of the invention, respectively. Table 2 and Table 5 show the parameters of aspheric surfaces of aspheric lenses in Table 1 and Table 4, respectively.

Figure 1:
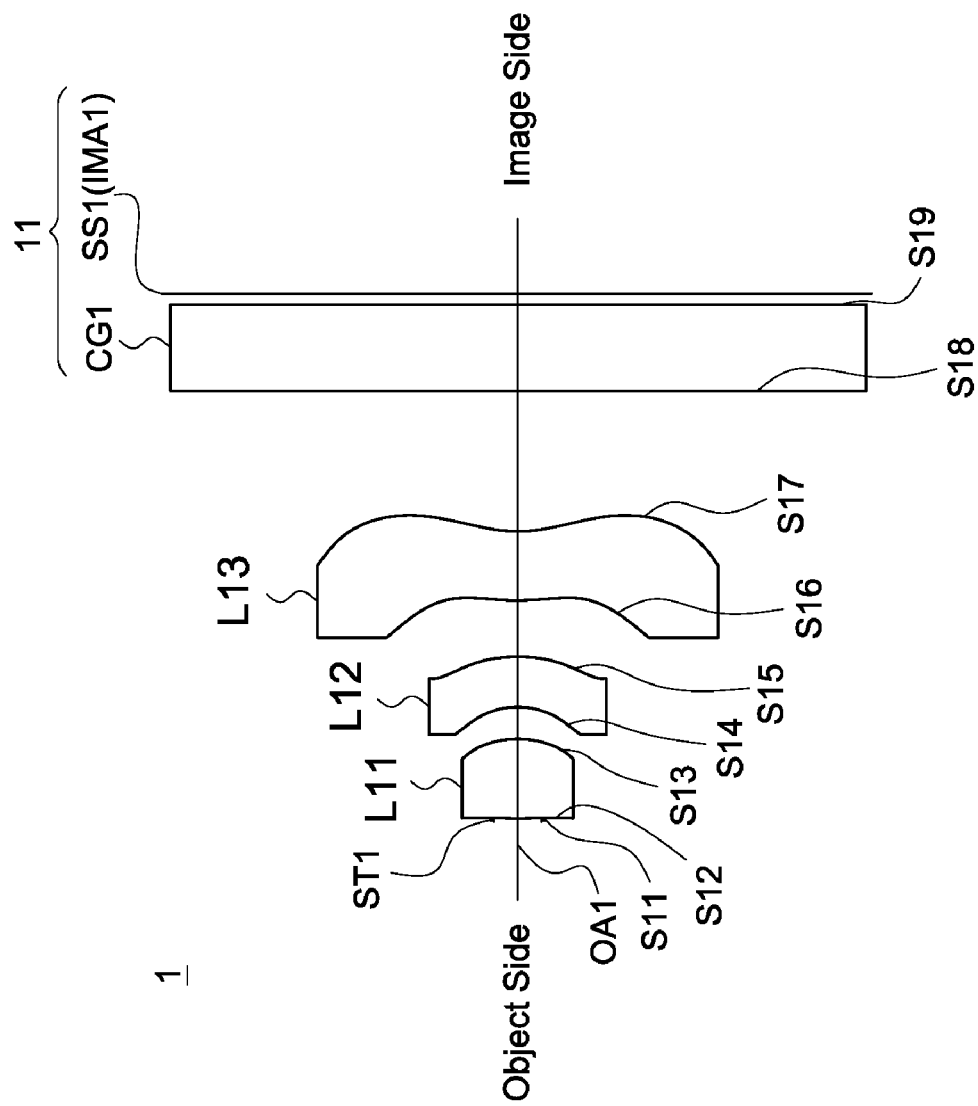
FIG. 1 is a lens layout diagram of a lens assembly in accordance with a first embodiment of the invention.
Figure 5:
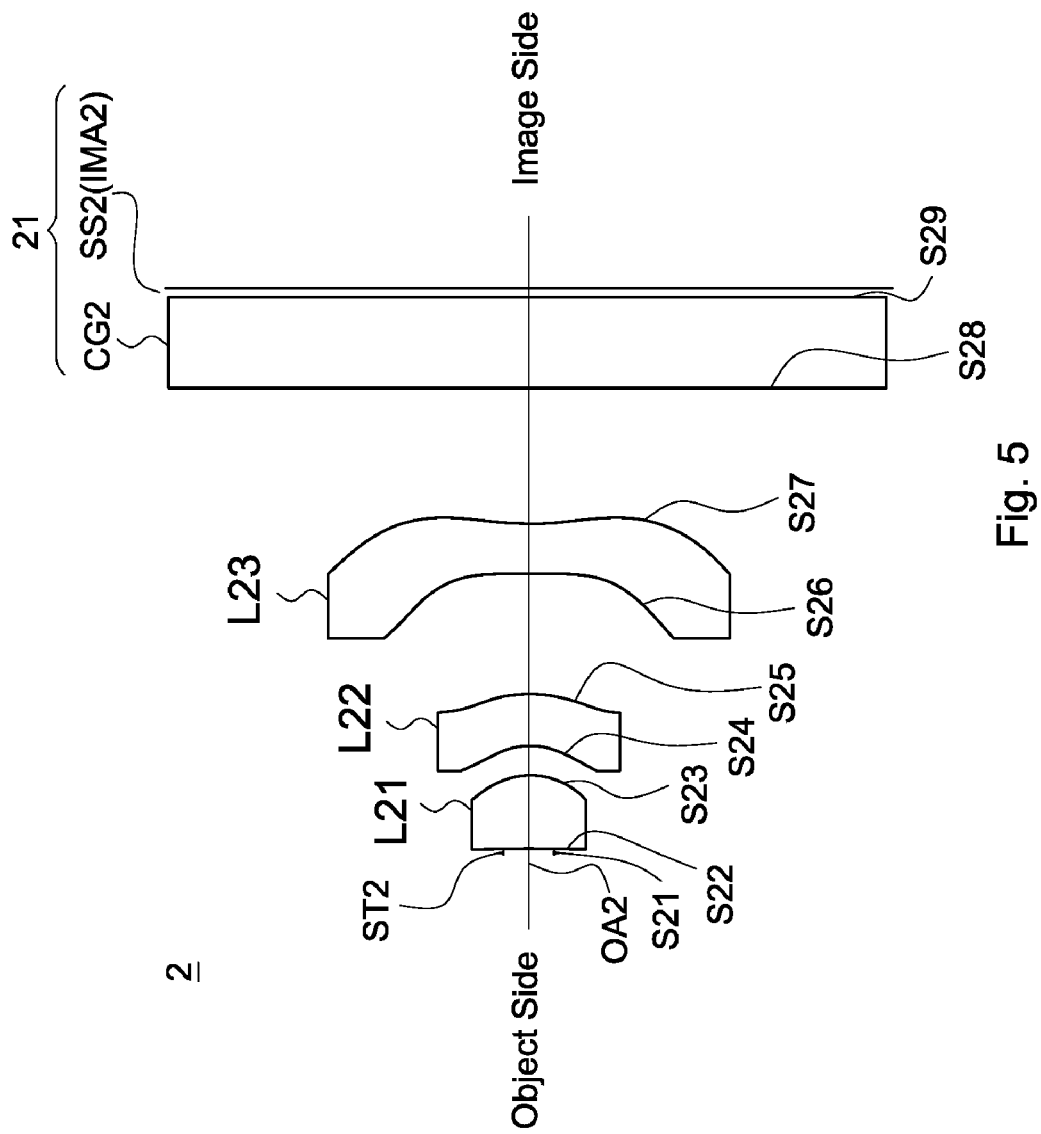
FIG. 5 is a lens layout diagram of a lens assembly in accordance with a second embodiment of the invention.

FIG. 1 and FIG. 5 are the lens layout diagrams of the lens assembly in accordance with the first embodiment and the second embodiment of the invention, respectively. The first lenses L11, L21 are with positive refractive power and are made of plastic. The image-side surfaces thereof S13, S23 are convex. Both of the object-side surfaces S12, S22, and the image-side surfaces S13, S23 are aspheric surfaces.

The second lenses L12, L22 are meniscus lenses with negative refractive power, and are made of plastic. The object-side surfaces thereof S14, S24 are concave. The image-side surfaces thereof S15, S25 are convex. Both the object-side surfaces S14, S24 and the image-side surface S15, S25 are aspheric surface.

The third lenses L13, L23 are meniscus lenses with negative refractive power, and are made of plastic. The object-side surfaces thereof S16, S26 are convex. The image-side surfaces thereof S17, S27 are concave. Both the object-side surfaces S16, S26 and the image-side surfaces thereof S17, S27 are aspheric surfaces.

In addition, the lens assemblies 1, 2 satisfy at least one of the following conditions:

$$0.4<BFL/TTL<0.5; \quad (1)$$

$$0.8<(R11-R12)/(R11+R12)<1.7; \quad (2)$$

$$-3<f3/f<-1; \quad (3)$$

$$-3<R11/R22<7; \quad (4)$$

$$0.5 \text{ mm}<D1+D3<2.4 \text{ mm}; \quad (5)$$

$$0.3<D3/IH<0.6; \quad (6)$$

$$0<SL/TTL<0.008; \quad (7)$$

$$0.7<f1/D1<2; \quad (8)$$

$$80<f/SL<160; \quad (9)$$

$$2<f/D1<3.5; \quad (10)$$

For the first embodiment and the second embodiment, BFL is an interval from the image-side surfaces S17, S27 of the third lenses L13, L23 to the image planes IMA1, IMA2 along the optical axes OA1, OA2, respectively. TTL is an interval from the object-side surfaces S12, S22 of the first lenses L11, L21 to the image planes IMA1, IMA2 along the optical axes OA1, OA2, respectively. SL is an interval from the stops ST1, ST2 to the object-side surfaces S12, S22 of the first lenses L11, L12 along the optical axes OA1, OA2, respectively. R11 is a radius of curvature of the object-side surfaces S12, S22 of the first lenses L11, L12, respectively. R12 is a radius of curvature of the image-side surfaces S13, S23 of the first lenses L11, L12, respectively. R22 is a radius of curvature of the image-side surfaces S15, S25 of the second lenses L12, L22, respectively. $f_1$ is an effective focal length of the first lenses L11, L21. $f_3$ is an effective focal length of the first lenses L13, L31. f is an effective focal length of the lens assemblies 1,2. D1 is a larger one of optical effective diameter of the object-side surface and the image-side surface of the first lenses L11, L21. D3 is a larger one of optical effective diameter of the object-side surface and the image-side surface of the third lenses L13, L23. IH is a diagonal length of an effective pixel range of the sensing planes SS1, SS2. With the lens assemblies 1, 2 satisfying at least one of the above conditions (1)-(10), the total lens length can be effectively shorten, the height of the lens can be effectively shorten, the field of view can be effectively increased, the environmental temperature change can be effectively resisted, the resolution can be effectively increased, and the aberration can be effectively corrected.

When the lens assembly satisfies the condition (1): $0.4<BFL/TTL<0.5$, the total lens length can be effectively shorten. When the lens assembly satisfies the condition (2): $0.8<(R11-R12)/(R11+R12)<1.7$, the field of view can be effectively manipulated and the aberration can be effectively corrected. When the lens assembly satisfies the condition (3): $-3<f3/f<-1$, the aberration can be effectively corrected and the resolution can be effectively increased. When the lens assembly satisfies the condition (4): $-3<R11/R22<7$, the distortion can be effectively corrected. When the lens assembly satisfies the condition (5): 0.5 mm$<D1+D3<2.4$ mm or the condition (6): $0.3<D3/IH<0.6$, the size can be effectively minimize. When the lens assembly satisfies the condition (7): $0<SL/TTL<0.008$, the height of the lens can be effectively shorten.

A detailed description of the lens assembly in accordance with the first embodiment of the invention is as follows. Referring to FIG. 1, the lens assembly 1 includes a stop ST1, a first lens L11, a second lens L12, a third lens L13, and an electron-sensitive element 11, all of which are arranged in order from an object side to an image side along an optical axis OA1. The electron-sensitive element 11 includes a cover glass CG1 and a sensing plane SS1. In operation, an image of light rays from the object side is formed at the sensing plane SS1. The sensing plane SS1 is the image plane IMA1 of the lens assembly 1. According to paragraphs [0024]-[0028], the first lens L11 is a biconvex lens. The object-side surface S12 of the first lens L11 is a convex surface. Both an object-side surface S18 and an image-side surface S19 of the cover glass CG1 are flat surfaces. With the above design of the lenses, the stop ST1, and at least one of the conditions (1)-(10) satisfied, the lens assembly 1 is capable of an effective shorter total lens length, an effective shorter lens height, an effective increased field of view, an effective resisted environmental temperature change, an effective increased resolution, and an effective corrected aberration as well as chromatic aberration.

Table 1 shows the optical specification of the lens assembly 1 in FIG. 1. The embodiment with the refractive power shown in Table 1 and the conditions (1)-(10) satisfied is the better embodiment.

TABLE 1

| | Effective Focal Length = 1.555 mm | | | | F-number = 7.2 | |
|---|---|---|---|---|---|---|
| | Total Lens Length = 2.432 mm | | | | Field Of View = 83.0 Degrees | |
| Surface Number | Radius of Curvature (mm) | Thickness (mm) | Nd | Vd | Effective Focal Length (mm) | Remark |
| S11 | ∞ | 0.010 | | | | ST1 |
| S12 | 2.127 | 0.366 | 1.544 | 56.1 | 0.7991 | L11 |
| S13 | −0.513 | 0.147 | | | | |
| S14 | −0.412 | 0.232 | 1.636 | 23.9 | −1.7663 | L12 |
| S15 | −0.792 | 0.260 | | | | |
| S16 | 1.090 | 0.318 | 1.544 | 56.1 | −3.5384 | L13 |
| S17 | 0.625 | 0.653 | | | | |
| S18 | ∞ | 0.400 | 1.517 | 64.2 | | CG1 |
| S19 | ∞ | 0.045 | | | | |

The aspheric surface sag z of each aspheric lens in table 1 can be calculated by the following formula:

$$z = ch^2/\{1+[1-(k+1)c^2h^2]^{1/2}\} + Ah^4 + Bh^6 + Ch^8 + Dh^{10} + Eh^{12} + Fh^{14} + Gh^{16}$$

where c is curvature, h is the vertical distance from the lens surface to the optical axis, k is conic constant and A to G are aspheric coefficients.

In the first embodiment, the conic constant k and the aspheric coefficients A to G of each aspheric lens are shown in Table 2.

TABLE 2

| Surface Number | S12 | S13 | S14 | S15 | S16 | S17 |
|---|---|---|---|---|---|---|
| k | 4.9996E+01 | 8.0961E−01 | 2.6578E−01 | 1.7016E−01 | −2.0161E+01 | −4.3267E+00 |
| A | −2.2166E+00 | −3.6448E+00 | −6.0606E+00 | −3.8253E+00 | −3.2922E+00 | −1.8996E+00 |
| B | −3.8455E+02 | −7.3100E+00 | 8.2361E+01 | 3.6669E+01 | 1.4148E+00 | 4.5780E+00 |
| C | 4.9815E+04 | −3.4508E+02 | −2.3008E+03 | −2.6597E+02 | 1.5748E+01 | −7.3292E+00 |
| D | −3.3086E+06 | 1.2602E+04 | 5.0498E+04 | 1.6499E+03 | −4.6225E+01 | 4.5540E+00 |
| E | 8.1027E+07 | −9.8723E+04 | −2.5726E+05 | 2.4490E+03 | −3.5004E+01 | 3.6135E+00 |
| F | 0.0000E+00 | 0.0000E+00 | −1.2394E+06 | −4.3102E+04 | 4.8648E+02 | −6.4673E+00 |
| G | 0.0000E+00 | 0.0000E+00 | 9.7790E+06 | 7.5173E+04 | −6.6820E+02 | −7.1681E−01 |

Table 3 shows the parameters and condition values for conditions (1)-(10) in accordance with the first embodiment of the invention. It can be seen from Table 3 that the lens assembly 1 of the first embodiment satisfies the conditions (1)-(10).

TABLE 3

| BFL | 1.098 mm | D1 | 0.5134 mm | D3 | 1.8468 mm |
|---|---|---|---|---|---|
| SL | 0.01 mm | IH | 3.284 mm | | |
| BFL/TTL | 0.45 | f3/f | −2.28 | R11/R22 | −2.69 |
| D1 + D3 | 2.36 mm | D3/IH | 0.56 | SL/TTL | 0.004 |
| f1/D1 | 1.56 | f/SL | 155.48 | f/D1 | 3.03 |
| (R11 − R12)/(R11 + R12) | 1.64 | | | | |

Figure 2:
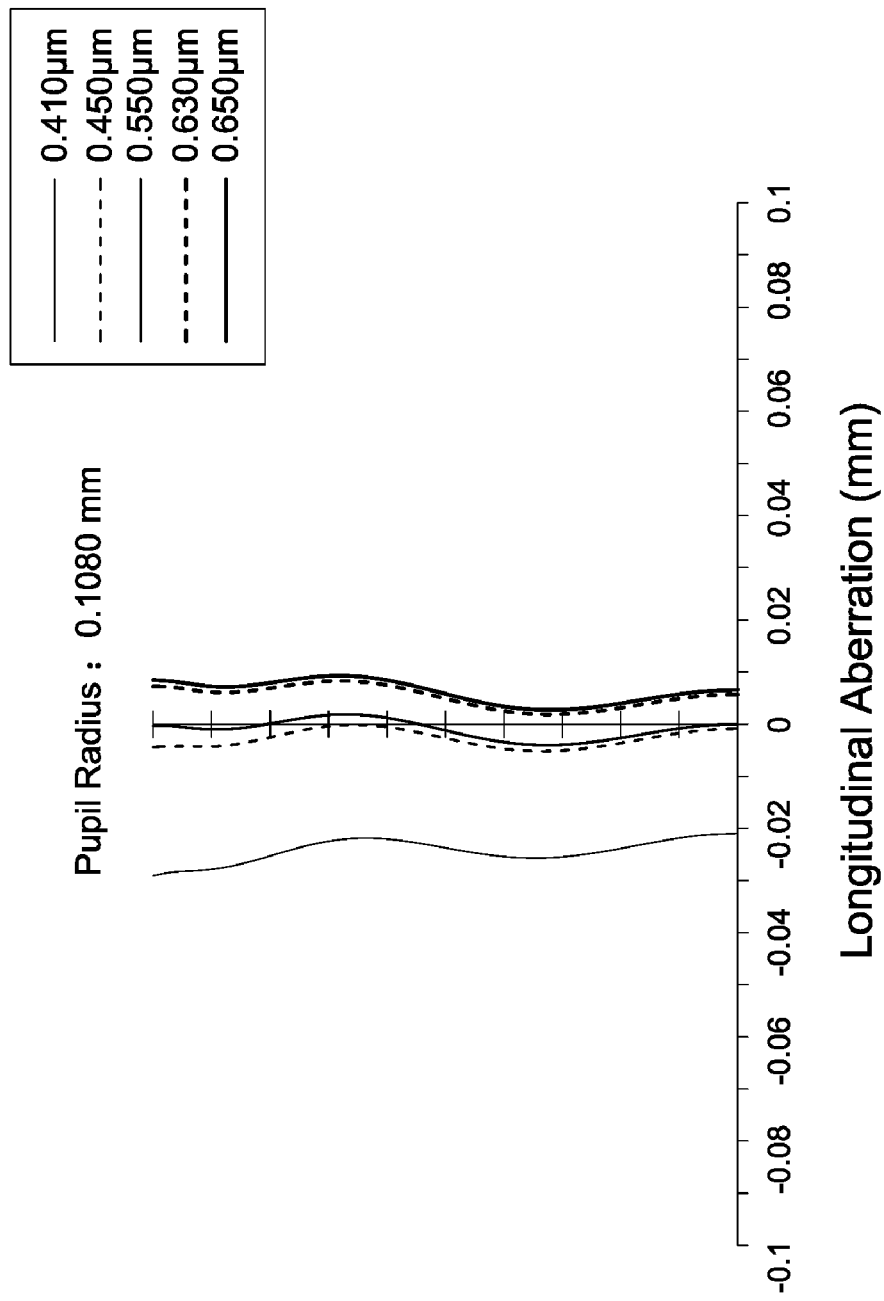
FIG. 2 is a longitudinal aberration diagram of the lens assembly in accordance with the first embodiment of the invention.
Figure 3:
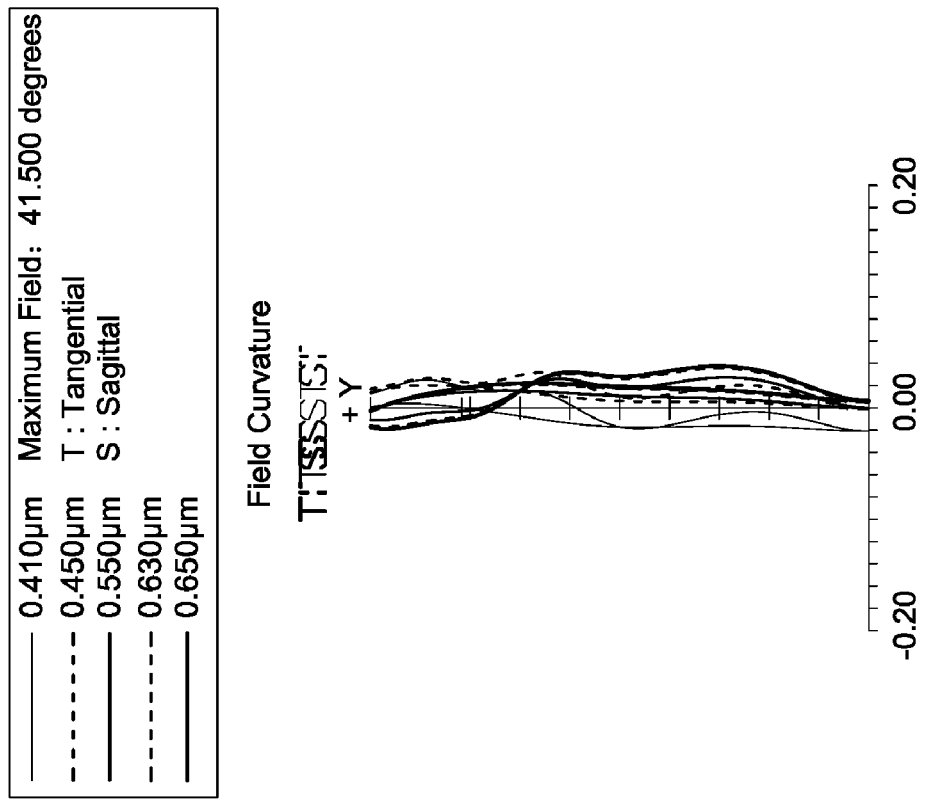
FIG. 3 is a field curvature diagram of the lens assembly in accordance with the first embodiment of the invention.
Figure 4:
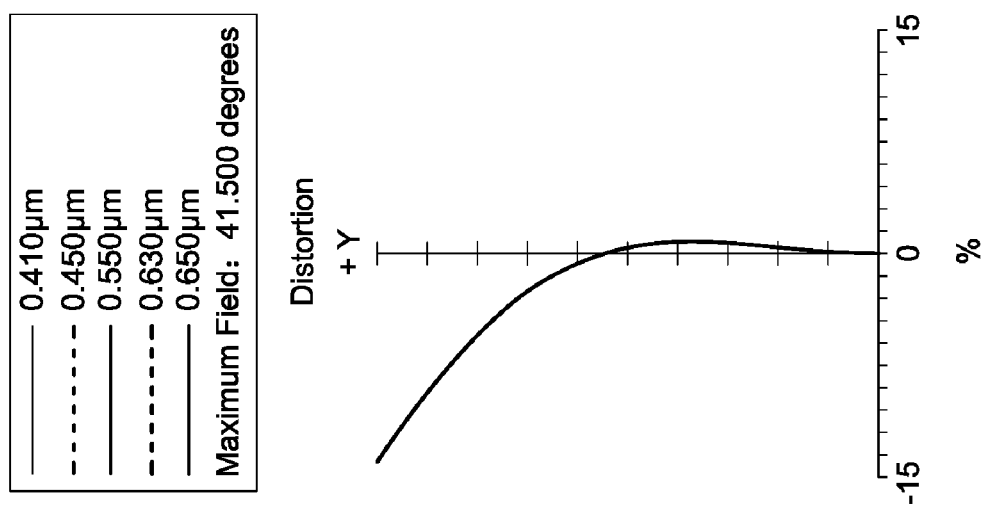
FIG. 4 is a distortion diagram of the lens assembly in accordance with the first embodiment of the invention.

By the above arrangement of the lenses and the stop ST1, the lens assembly 1 of the first embodiment can meet the requirements of optical performance. It can be seen from FIG. 2 that the longitudinal aberration in the lens assembly 1 of the first embodiment ranges from −0.03 mm to 0.01 mm. It can be seen from FIG. 3 that the field curvature of tangential direction and sagittal direction in the lens assembly 1 of the first embodiment ranges from −0.03 mm to 0.04 mm. It can be seen from FIG. 4 that the distortion in the lens assembly 1 of the first embodiment ranges from −15% to 1.5%. It is obvious that the longitudinal aberration, the field curvature, and the distortion of the lens assembly 1 of the first embodiment can be corrected effectively. Therefore, the lens assembly 1 of the first embodiment is capable of good optical performance.

Referring to FIG. 5, FIG. 5 is the lens layout diagram and the optical path of the lens assembly in accordance with the second embodiment. the lens assembly 2 includes a stop ST2, a first lens L21, a second lens L22, a third lens L23, and an electron-sensitive element 21, all of which are arranged in order from an object side to an image side along an optical axis OA2. The electron-sensitive element 21 includes a cover glass CG2 and a sensing plane SS2. In operation, an image of light rays from the object side is formed at the sensing plane SS2. The sensing plane SS2 is the image plane IMA2 of the lens assembly 2. According to paragraphs [0024]-[0028], the first lens L21 is a meniscus lens. The object-side surface S22 of the first lens L11 is a concave surface. Both an object-side surface S28 and an image-side surface S29 of the cover glass CG1 are flat surfaces. With the above design of the lenses, the stop ST2, and at least one of the conditions (1)-(10) satisfied, the lens assembly 2 is capable of an effective shorter total lens length, an effective shorter lens height, an effective increased field of view, an effective resisted environmental temperature change, an effective increased resolution, and an effective corrected aberration as well as chromatic aberration.

Table 4 shows the optical specification of the lens assembly 2 in FIG. 5. The embodiment with the refractive power shown in Table 2 and the conditions (1)-(10) satisfied is the better embodiment.

TABLE 4

| | Effective Focal Length = 1.558 mm | | | | F-number = 7.2 | |
|---|---|---|---|---|---|---|
| | Total Lens Length = 2.527 mm | | | | Field Of View = 83.0 Degrees | |
| Surface Number | Radius of Curvature (mm) | Thickness (mm) | Nd | Vd | Effective Focal Length (mm) | Remark |
| S21 | ∞ | 0.010 | | | | ST2 |
| S22 | −3.762 | 0.329 | 1.525 | 56.0 | 0.6536 | L21 |
| S23 | −0.336 | 0.133 | | | | |
| S24 | −0.320 | 0.233 | 1.661 | 20.4 | −1.5362 | L22 |
| S25 | −0.608 | 0.541 | | | | |
| S26 | 9.793 | 0.224 | 1.525 | 56.0 | −2.5268 | L23 |
| S27 | 1.200 | 0.300 | | | | |
| S28 | ∞ | 0.400 | 1.517 | 64.2 | | CG2 |
| S29 | ∞ | 0.357 | | | | |

The definition of the aspheric surface sag z of each aspheric lens in table 4 is the same as that of in Table 1 and is not described here again. In the second embodiment, the conic constant k and the aspheric coefficients A, B, C, D, E, F, G of each aspheric lens are shown in Table 5.

TABLE 5

| Surface Number | S22 | S23 | S24 | S25 | S26 | S27 |
|---|---|---|---|---|---|---|
| k | −4.3612E+01 | 4.6112E−02 | −2.1052E+00 | −1.4800E+00 | −4.7847E+06 | −1.0181E+01 |
| A | 9.0450E−02 | 3.1626E−01 | −4.3870E+00 | −2.1928E−01 | −2.3195E+00 | −1.2374E+00 |
| B | −1.0847E+03 | 1.3656E+01 | 4.2253E+01 | 6.6932E+00 | 1.6469E−01 | 1.2235E+00 |
| C | 1.1179E+05 | −2.3970E+02 | 5.8224E+02 | 2.9657E+01 | −1.3460E−02 | −4.7257E−01 |
| D | −5.9624E+06 | 1.1656E+04 | −1.5923E+03 | 1.9017E+02 | 4.3453E+00 | −4.8327E−01 |
| E | 1.2200E+08 | −1.1548E+05 | −6.7520E+04 | −2.6736E+01 | 1.6658E+01 | 1.0913E−01 |
| F | 0.0000E+00 | 0.0000E+00 | 4.1520E+05 | −.8218E+03 | 2.2035E+01 | 4.9892E−01 |
| G | 0.0000E+00 | 0.0000E+00 | −.9686E+05 | 1.0431E+04 | −.0040E+02 | 1.6960E−01 |

Table 6 shows the parameters and condition values for conditions (1)-(10) in accordance with the second embodiment of the invention. It can be seen from Table 6 that the lens assembly 2 of the second embodiment satisfies the conditions (1)-(10).

TABLE 6

| BFL | 1.057 mm | D1 | 0.4984 mm | D3 | 1.7854 mm |
|---|---|---|---|---|---|
| SL | 0.018 mm | IH | 3.284 mm | | |
| BFL/TTL | 0.42 | f3/f | −1.62 | R11/R22 | 6.19 |
| D1 + D3 | 2.28 mm | D3/IH | 0.54 | SL/TTL | 0.007 |
| f1/D1 | 1.31 | f/SL | 86.56 | f/D1 | 3.13 |
| (R11 − R12)/(R11 + R12) | 0.84 | | | | |

Figure 6:
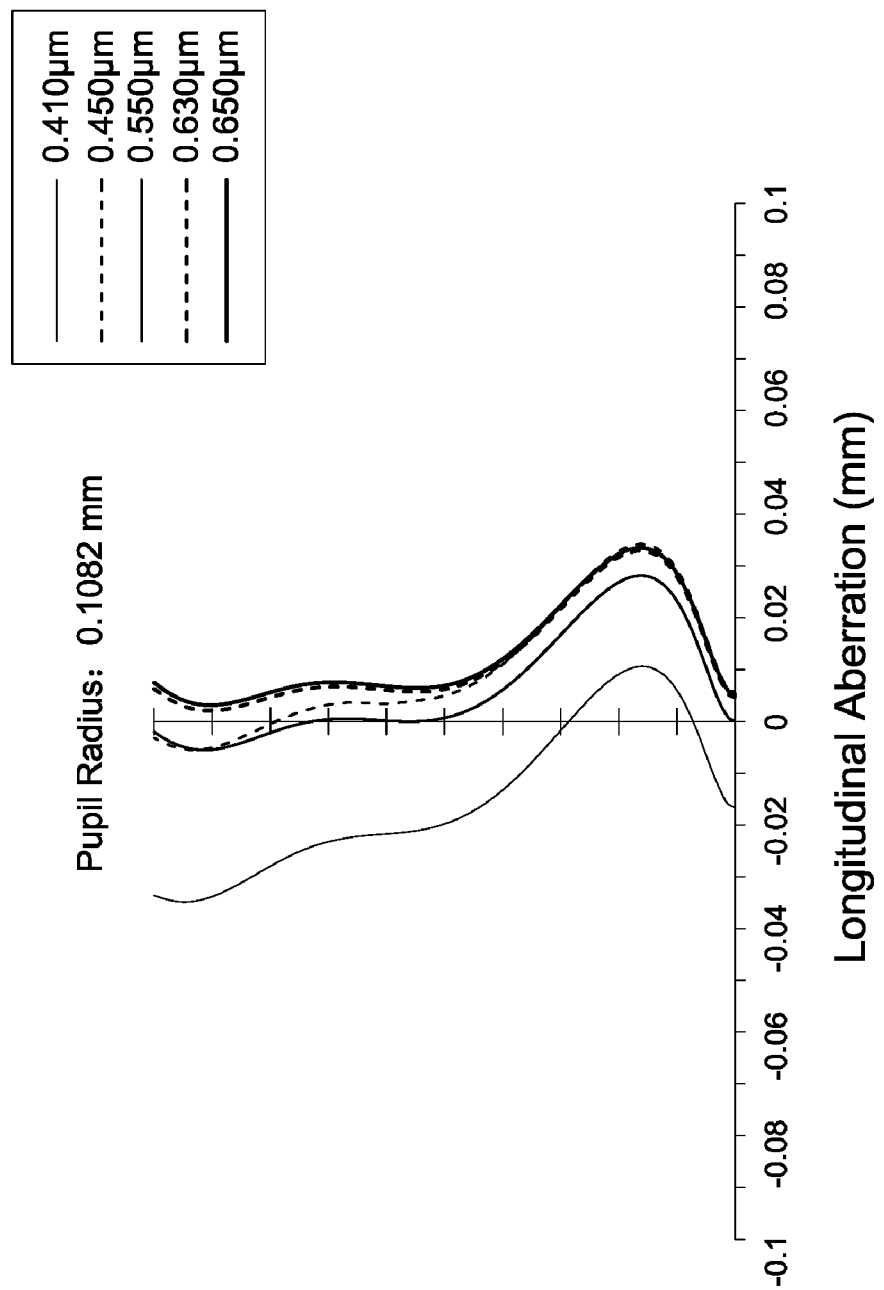
FIG. 6 is a longitudinal aberration diagram of the lens assembly in accordance with the second embodiment of the invention.
Figure 7:
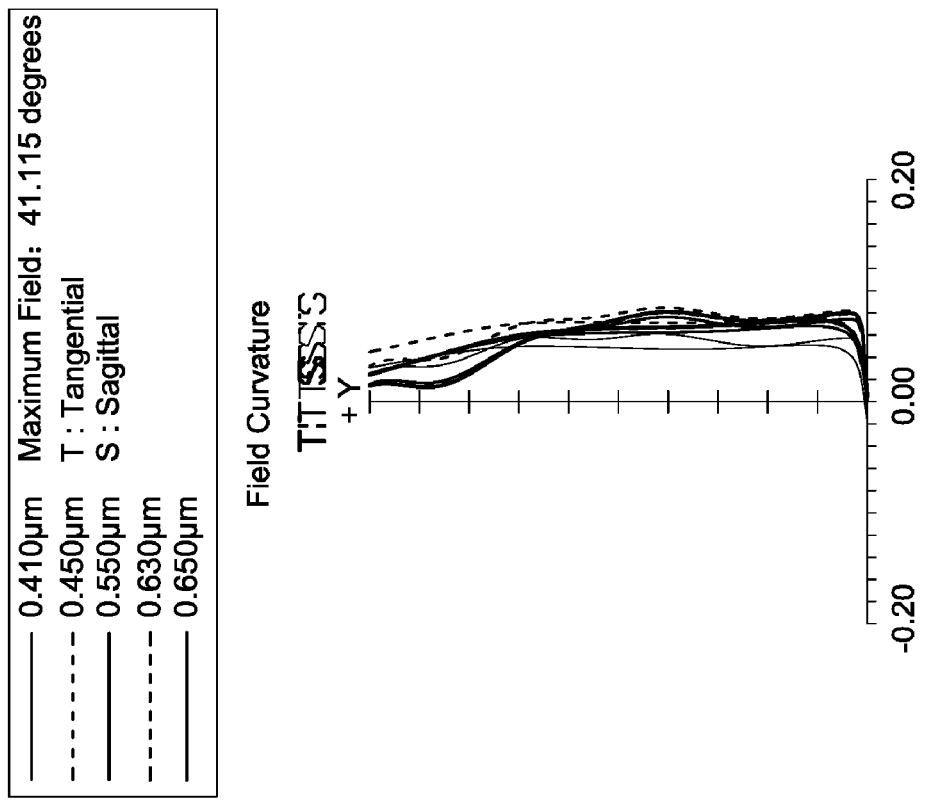
FIG. 7 is a field curvature diagram of the lens assembly in accordance with the second embodiment of the invention.
Figure 8:
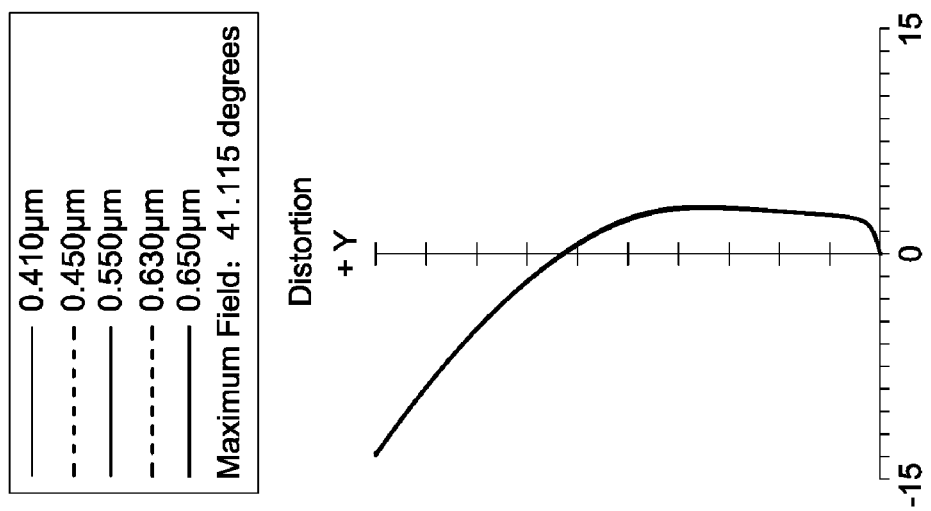
FIG. 8 is a distortion diagram of the lens assembly in accordance with the second embodiment of the invention.

By the above arrangement of the lenses and the stop ST2, the lens assembly 2 of the second embodiment can meet the requirements of optical performance. It can be seen from FIG. 6 that the longitudinal aberration in the lens assembly 2 of the first embodiment ranges from −0.04 mm to 0.04 mm. It can be seen from FIG. 7 that the field curvature of tangential direction and sagittal direction in the lens assembly 2 of the first embodiment ranges from −0.02 mm to 0.09 mm. It can be seen from FIG. 8 that the distortion in the lens assembly 2 of the first embodiment ranges from −15% to 3.5%. It is obvious that the longitudinal aberration, the field curvature, and the distortion of the lens assembly 2 of the second embodiment can be corrected effectively. Therefore, the lens assembly 2 of the second embodiment is capable of good optical performance.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A lens assembly, comprising:
a first lens with positive refractive power;
a second lens with negative refractive power and including a convex surface facing an image side; and
a third lens with negative refractive power and including a convex surface facing an object side;
wherein the first lens, the second lens and the third lens are arranged in order from the object side to the image side along an optical axis;
wherein the lens assembly satisfies at least one of the following conditions:

$2 < f/D1 < 3.5$, $0.5\ mm < D1 + D3 < 2.4\ mm$, $0.7 < f1/D1 < 2$, wherein f is an effective focal length of the lens assembly, D1 is a larger one of optical effective diameter of an object-side surface and an image-side surface of the first lens, D3 is a larger one of optical effective diameter of an object-side surface and an image-side surface of the third lens, and f1 is an effective focal length of the first lens.

2. The lens assembly as claimed in claim 1, wherein the first lens includes a convex surface facing the image side.

3. The lens assembly as claimed in claim 2, wherein the first lens is a bi-convex lens, the second lens is a meniscus lens, and the third lens is a meniscus lens.

4. The lens assembly as claimed in claim 3, wherein the first lens further includes a convex surface facing the object side, the second lens further includes a concave surface facing the object side, and the third lens further includes a concave surface facing the image side.

5. The lens assembly as claimed in claim 2, wherein the first lens is a meniscus lens, the second lens is a meniscus lens, and the third lens is a meniscus lens.

6. The lens assembly as claimed in claim 5, wherein the first lens further includes a concave surface facing the object side, the second lens further includes a concave surface facing the object side, and the third lens further includes a concave surface facing the image side.

7. The lens assembly as claimed in claim 1, further comprising a stop between the object side and the first lens, wherein:
the lens assembly satisfies at least one of the following conditions:

$80 < f/SL < 160$, $0 < SL/TTL < 0.008$, wherein f is the effective focal length of the lens assembly, SL is an interval from the stop to the object-side surface of the first lens along the optical axis, and TTL is an interval from the object-side surface of the first lens to an image plane along the optical axis; and
the first lens, the second lens, and the third lens are all made of plastic.

8. The lens assembly as claimed in claim 1, wherein the lens assembly satisfies at least one of the following conditions:

$0.8 < (R11 - R12)/(R11 + R12) < 1.7$, $-3 < R11/R22 < 7$, wherein R11 is a radius of curvature of the object-side surface of the first lens, R12 is a radius of curvature of the image-side surface of the first lens, and R22 is a radius of curvature of an image-side surface of the second lens.

9. The lens assembly as claimed in claim 1, further comprising an electron-sensitive element between the third lens and the image side;
wherein electron-sensitive element includes a sensing plane.

10. A lens assembly, comprising:
a first lens with positive refractive power;
a second lens with negative refractive power and including a convex surface facing an image side; and
a third lens with negative refractive power and including a convex surface facing an object side;
wherein the first lens, the second lens and the third lens are arranged in order from the object side to the image side along an optical axis;
wherein the lens assembly satisfies:

$$0.4 < BFL/TTL < 0.5,$$

wherein BFL is an interval from an image-side surface of the third lens to an image plane along the optical axis, TTL is an interval from an object-side surface of the first lens to the image plane along the optical axis.

11. The lens assembly as claimed in claim 10, wherein the first lens includes a convex surface facing the image side.

12. The lens assembly as claimed in claim 11, wherein the first lens is a bi-convex lens, the second lens is a meniscus lens, and the third lens is a meniscus lens.

13. The lens assembly as claimed in claim 12, wherein the first lens further includes a convex surface facing the object side, the second lens further includes a concave surface facing the object side, and the third lens further includes a concave surface facing the image side.

14. The lens assembly as claimed in claim 11, wherein the first lens is a meniscus lens, the second lens is a meniscus lens, and the third lens is a meniscus lens.

15. The lens assembly as claimed in claim 14, wherein the first lens further includes a concave surface facing the object side, the second lens further includes a concave surface facing the object side, and the third lens further includes a concave surface facing the image side.

16. The lens assembly as claimed in claim 10, further comprising a stop between the object side and the first lens, wherein:
the lens assembly satisfies at least one of the following conditions:

$$80 < f/SL < 160,$$

$$0 < SL/TTL < 0.008,$$

wherein f is an effective focal length of the lens assembly, SL is an interval from the stop to an object-side surface of the first lens along the optical axis, and TTL is the interval from the object-side surface of the first lens to the image plane along the optical axis.

17. The lens assembly as claimed in claim 10, wherein the lens assembly satisfies at least one of the following conditions:

$$0.8 < (R11-R12)/(R11+R12) < 1.7,$$

$$-3 < R11/R22 < 7,$$

$$2 < f/D1 < 3.5,$$

$$-3 < f3/f < -1,$$

$$0.5 \text{ mm} < D1+D3 < 2.4 \text{ mm},$$

$$0.7 < f1/D1 < 2,$$

wherein R11 is a radius of curvature of the object-side surface of the first lens, R12 is a radius of curvature of an image-side surface of the first lens, R22 is a radius of curvature of an image-side surface of the second lens, f is an effective focal length of the lens assembly, D1 is a larger one of optical effective diameter of the object-side surface and the image-side surface of the first lens, D3 is a larger one of optical effective diameter of an object-side surface and the image-side surface of the third lens, f1 is an effective focal length of the first lens, and f3 is an effective focal length of the third lens.

18. A lens assembly, comprising:
a first lens with positive refractive power;
a second lens with negative refractive power and including a convex surface facing an image side;
a third lens with negative refractive power and including a convex surface facing an object side; and
an electron-sensitive element;
wherein the first lens, the second lens, the third lens, and the electron-sensitive element are arranged in order from the object side to the image side along an optical axis;
wherein the electron-sensitive element includes a sensing plane;
wherein the lens assembly satisfies at least one of the following conditions:

$$2 < f/D1 < 3.5,$$

$$-3 < f3/f < -1,$$

$$0.5 \text{ mm} < D1+D3 < 2.4 \text{ mm},$$

$$0.7 < f1/D1 < 2,$$

wherein f is an effective focal length of the lens assembly, D1 is a larger one of optical effective diameter of an object-side surface and an image-side surface of the first lens, D3 is a larger one of optical effective diameter of an object-side surface and an image-side surface of the third lens, f1 is an effective focal length of the first lens, and f3 is an effective focal length of the third lens;
wherein the lens assembly satisfies:

$$0.3 < D3/IH < 0.6,$$

wherein D3 is the larger one of optical effective diameter of the object-side surface and the image-side surface of the third lens, and IH is a diagonal length of an effective pixel range of the sensing plane.

19. The lens assembly as claimed in claim 18, wherein the first lens is a bi-convex lens and includes a convex surface facing the object side and a convex surface facing the image side, the second lens is a meniscus lens and further includes a concave surface facing the object side, and the third lens is a meniscus lens and further includes a concave surface facing the image side; or the first lens is a meniscus lens and includes a concave surface facing the object side and a convex surface facing the image side, the second lens is a meniscus lens and further includes a concave surface facing the object side, and the third lens is a meniscus lens and further includes a concave surface facing the image side.

20. The lens assembly as claimed in claim 18, further comprising a stop between the object side and the first lens, wherein:
the lens assembly satisfies at least one of the following conditions:

$$80 < f/SL < 160,$$

$0 < SL/TTL < 0.008,$ $0.8 (R11-R12)/(R11+R12) < 1.7,$ $-3 < R11/R22 < 7,$ wherein f is the effective focal length of the lens assembly, SL is an interval from the stop to the object-side surface of the first lens along the optical axis, TTL is an interval from the object-side surface of the first lens to an image plane along the optical axis, R11 is a radius of curvature of the object-side surface of the first lens, R12 is a radius of curvature of the image-side surface of the first lens, and R22 is a radius of curvature of an image-side surface of the second lens.

* * * * *